US009052124B2

(12) United States Patent
Pelletier

(10) Patent No.: US 9,052,124 B2
(45) Date of Patent: Jun. 9, 2015

(54) VERY HIGH PRESSURE SAMPLE CAPTURE AND TRANSPORTATION VESSEL

(75) Inventor: Michael T. Pelletier, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/878,580

(22) PCT Filed: Oct. 21, 2010

(86) PCT No.: PCT/US2010/053528
§ 371 (c)(1),
(2), (4) Date: Apr. 10, 2013

(87) PCT Pub. No.: WO2012/054038
PCT Pub. Date: Apr. 26, 2012

(65) Prior Publication Data
US 2014/0000582 A1    Jan. 2, 2014

(51) Int. Cl.
*F24J 2/54* (2006.01)
*E21B 49/08* (2006.01)
*F24J 2/12* (2006.01)
*F24J 2/24* (2006.01)

(52) U.S. Cl.
CPC ............ *F24J 2/541* (2013.01); *E21B 49/081* (2013.01); *F24J 2/12* (2013.01); *F24J 2/248* (2013.01)

(58) Field of Classification Search
USPC .............. 166/264, 107, 162, 163; 175/59
See application file for complete search history.

(56) References Cited

U.S. PATENT DOCUMENTS

| 7,124,819 | B2 | 10/2006 | Ciglenec et al. |
| 7,246,664 | B2 | 7/2007 | Shammai et al. |
| 7,258,167 | B2 | 8/2007 | Shammai et al. |
| 2002/0060067 | A1 | 5/2002 | Bolze et al. |
| 2002/0185313 | A1 | 12/2002 | Jones et al. |
| 2003/0066646 | A1* | 4/2003 | Shammai et al. ............ 166/264 |
| 2004/0099443 | A1 | 5/2004 | Meister et al. |

OTHER PUBLICATIONS

European Patent Office, Supplemental European Search Report, in European Application No. 10858756.9, which is the counterpart EP application to the instant application, Apr. 23, 2014.
IP Australia, Patent Examination Report No. 1 in Patent Application No. 2010362681, which is the counterpart AU application to the instant application. Aug. 7, 2014.

* cited by examiner

*Primary Examiner* — David Bagnell
*Assistant Examiner* — Taras P Bemko
(74) *Attorney, Agent, or Firm* — Howard L. Speight, PLLC

(57) ABSTRACT

An apparatus includes a sample chamber constructed according to a design certified by the Department of Transportation for transporting fluids at a first pressure P1. A cylindrical sample compartment exists within the sample chamber. The sample compartment is designed to withstand the pressure P1. The cylindrical sample compartment has a cylindrical inner surface with a radius r and a height h. A hollow cylindrical sleeve is secured to the cylindrical inner surface of the sample compartment and has a wall of thickness t. The sample chamber is capable of transporting fluids at a second pressure P2. P2 is higher than P1.

2 Claims, 8 Drawing Sheets

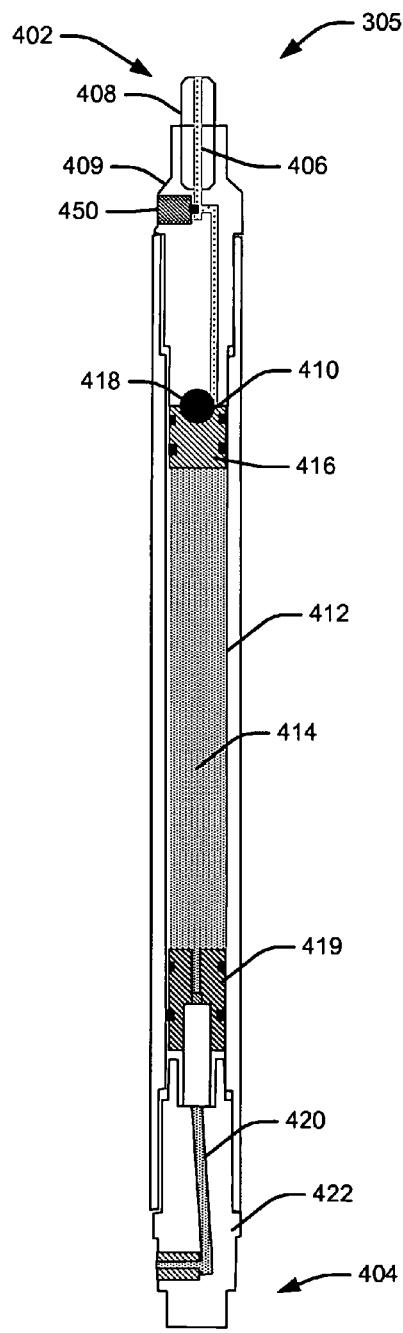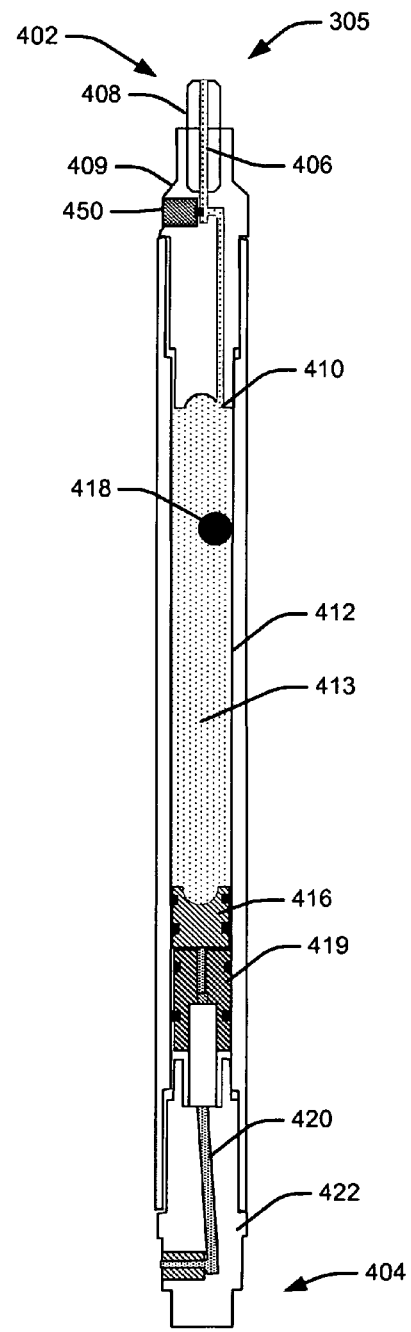
*FIG. 4A*  *FIG. 4B*

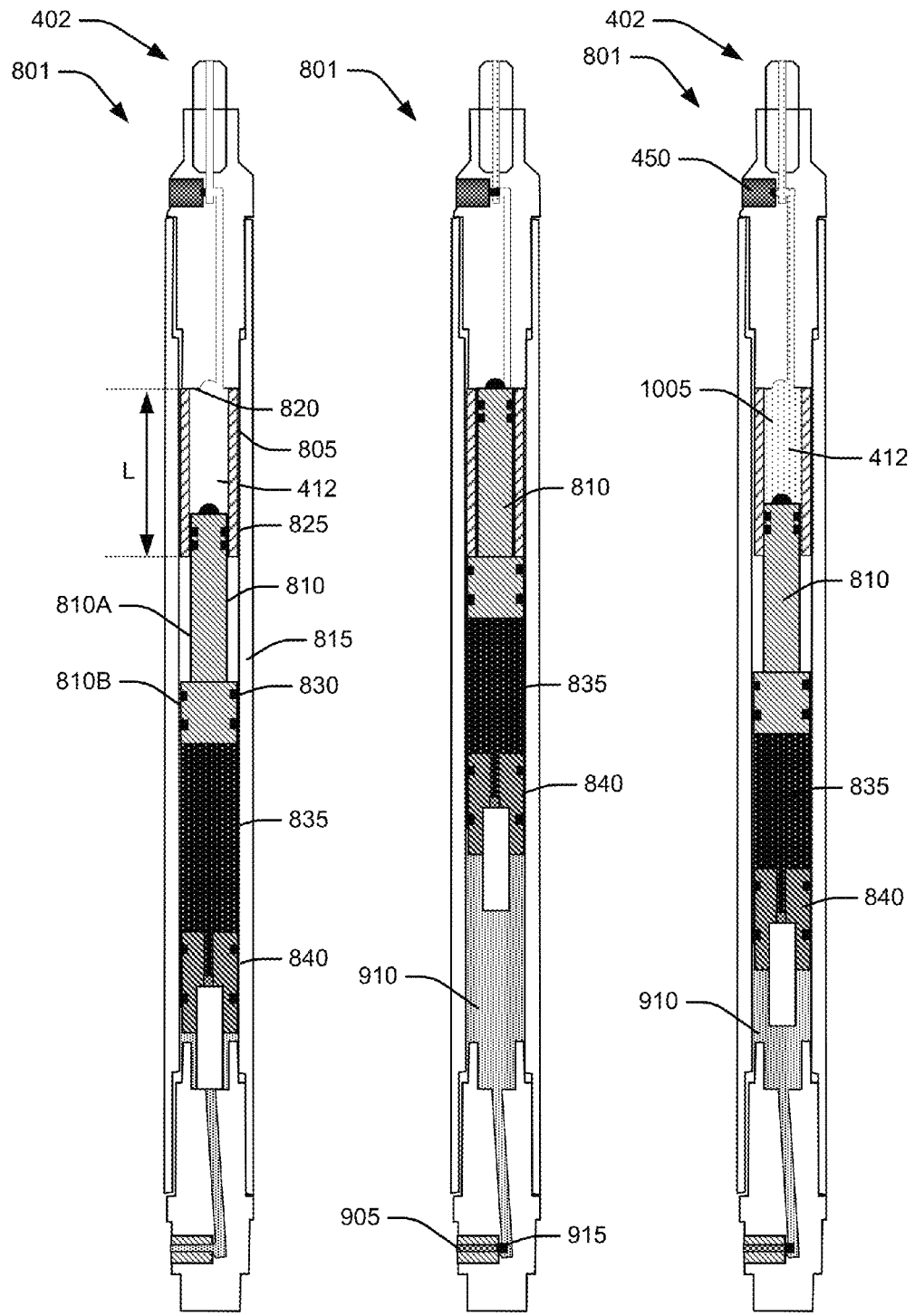
FIG. 8  FIG. 9  FIG. 10

VERY HIGH PRESSURE SAMPLE CAPTURE AND TRANSPORTATION VESSEL

BACKGROUND

Vessels containing samples of fluids from down hole formation taken by formation testing tools may be removed from the tool and transported to, for example, laboratories for testing. Such transportation can be challenging, especially when a vessel contains a sample taken at a high pressure.

BRIEF DESCRIPTION OF THE DRAWINGS

FIGS. 4A and 4B are cross-sectional representations of a sample chamber.

FIGS. 5-10 are cross-sectional representations of embodiments of sample chambers.

DETAILED DESCRIPTION

Figure 1:
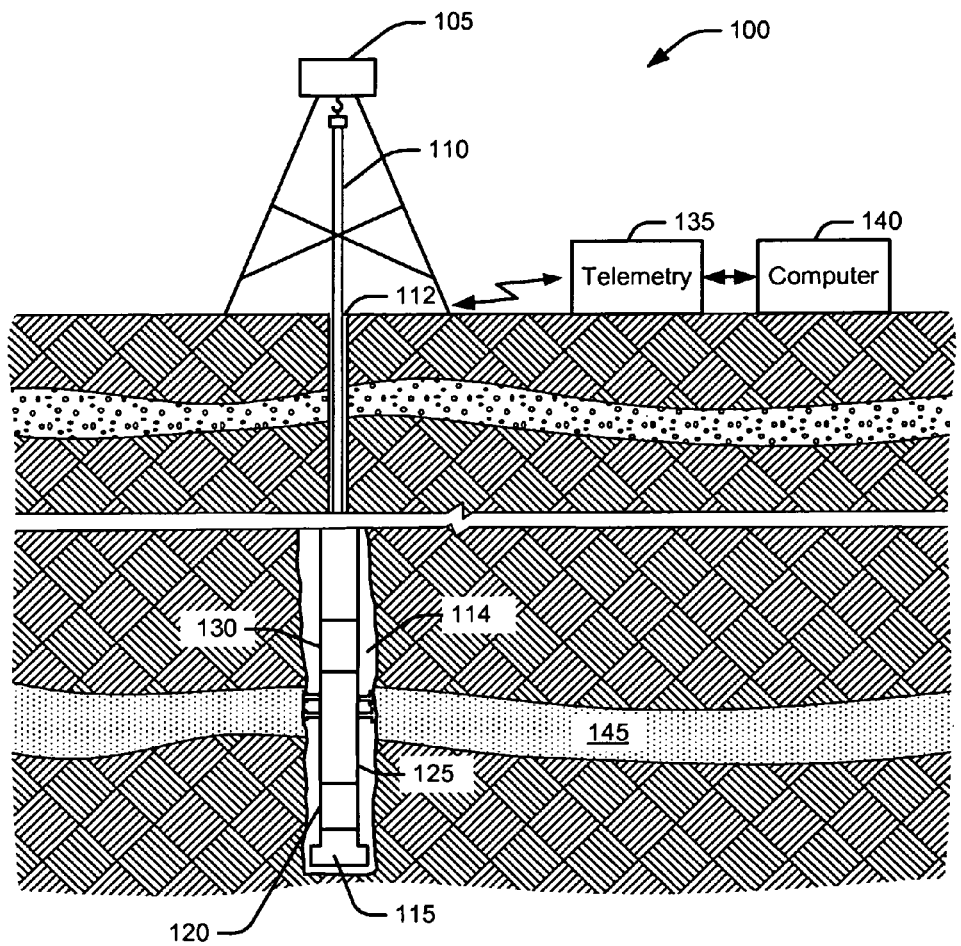
FIG. 1 illustrates a measure-while-drilling ("MWD") or logging-while-drilling ("LWD") environment.

An example environment 100, illustrated in FIG. 1, includes a derrick 105 from which a drill string 110 is suspended in a borehole 112. FIG. 1 is greatly simplified and for clarity does not show many of the elements that are used in the drilling process. In one embodiment, the volume within the borehole 112 around the drill string 110 is called the annulus 114. In one embodiment, the drill string includes a bit 115, a variety of actuators and sensors, shown schematically by element 120, a formation testing tool 125, and a telemetry section 130, through which the downhole equipment communicates with a surface telemetry system 135. In one embodiment, a computer 140, which in one embodiment includes input/output devices, memory, storage, and network communication equipment, including equipment necessary to connect to the Internet, receives data from the downhole equipment and sends commands to the downhole equipment.

The equipment and techniques described herein are also useful in a wireline or slickline environment. In one embodiment, for example, a formation testing tool may be lowered into the borehole 112 using wired drillpipe, wireline, coiled tubing (wired or unwired), or slickline. In one embodiment of a measurement-while-drilling or logging-while-drilling environment, such as that shown in FIG. 1, power for the formation testing tool is provided by a battery, by a mud turbine, or through a wired pipe from the surface, or through some other conventional means. In one embodiment of a wireline or slickline environment, power is provided by a battery or by power provided from the surface through the wired drillpipe, wireline, coiled tubing, or slickline, or through some other conventional means.

In one embodiment, the drilling equipment is not on dry land, as shown in FIG. 1 but is in a wetland or at sea. In such an environment, the derrick 105 (or another piece of equipment that performs the function of the derrick) is located on a drilling platform, such as a semi-submersible drilling rig, a drill ship, or a jack-up drilling rig. The drill string 110 extends from the derrick 105 through the water, to the sea floor, and into the formation.

Figure 2:
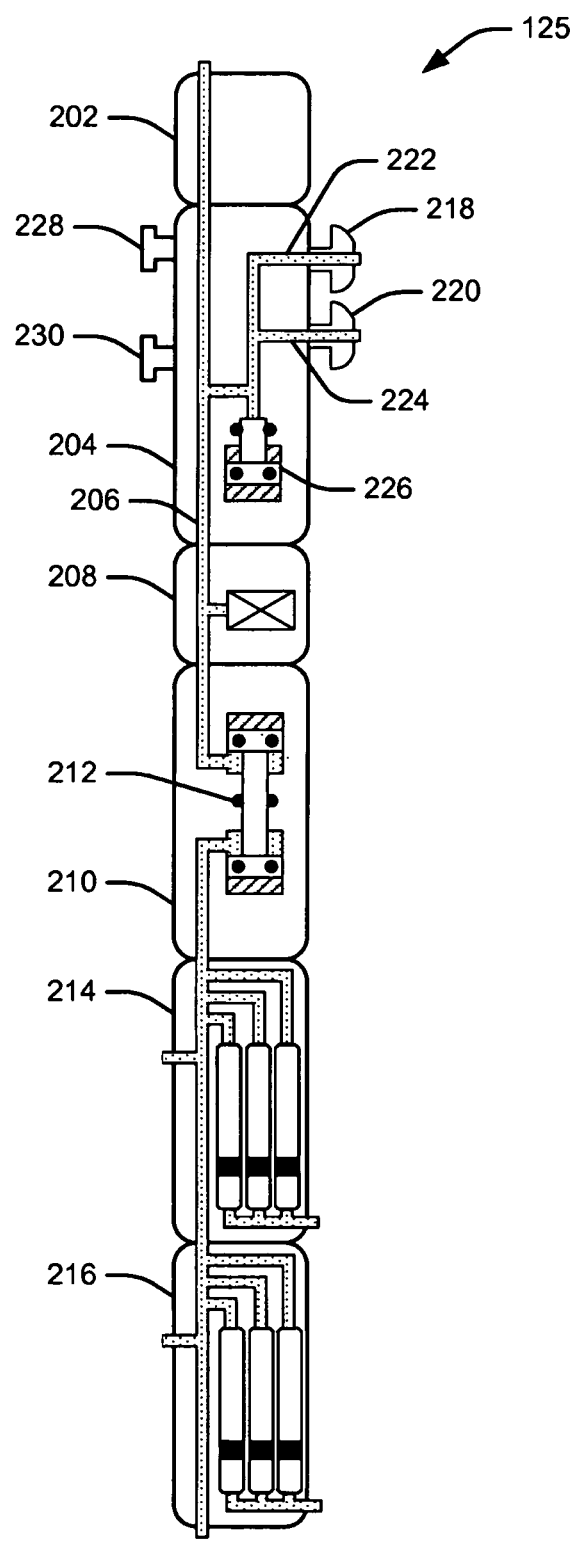
FIG. 2 is a schematic representation of one embodiment of a formation testing tool.

A more detailed, but still simplified, schematic of an embodiment of the formation testing tool 125 is shown in FIG. 2. In one embodiment, the formation testing tool 125 includes a power telemetry section 202 through which the tool communicates with other actuators and sensors 120 in the drill string, the drill string's telemetry section 130, and/or directly with the surface telemetry system 135. In one embodiment, the power telemetry section 202 is also the port through which the various actuators (e.g. valves) and sensors (e.g., temperature and pressure sensors) in the formation testing tool 125 are controlled and monitored. In one embodiment, the power telemetry section 202 includes a computer that exercises the control and monitoring function. In one embodiment, the control and monitoring function is performed by a computer in another part of the drill string (not shown) or by the computer 140 on the surface.

In one embodiment, the formation testing tool 125 includes a dual probe section 204, which extracts fluid from the reservoir, as described in more detail below, and delivers it to a channel 206 that extends from one end of the formation testing tool 125 to the other. In one embodiment, the channel 206 can be connected to other tools. In one embodiment, the formation testing tool 125 also includes a quartz gauge section 208, which includes sensors to allow measurement of properties, such as temperature and pressure, of the fluid in the channel 206. In one embodiment, the formation testing tool 125 includes a flow-control pump-out section 210, which includes a high-volume bidirectional pump 212 for pumping fluid through the channel 206. In one embodiment, the formation testing tool 125 includes two multi-chamber sections 214, 216, which are described in more detail below.

In one embodiment, the dual probe section 204 includes two probes 218, 220 which extend from the formation testing tool 125 and press against the borehole wall, as shown in FIG. 1. Returning to FIG. 2, probe channels 222, 224 connect the probes 218, 220 to the channel 206. The high-volume bidirectional pump 212 can be used to pump fluids from the reservoir, through the probe channels 222, 224 and to the channel 206. Alternatively, a low volume pump 226 can be used for this purpose. Two standoffs or stabilizers 228, 230 hold the formation testing tool 125 in place as the probes 218, 220 press against the borehole wall, as shown in FIG. 1. In one embodiment, the probes 218, 220 and stabilizers 228, 230 are retracted when the tool is in motion and are extended to sample the formation fluids.

Figure 3:
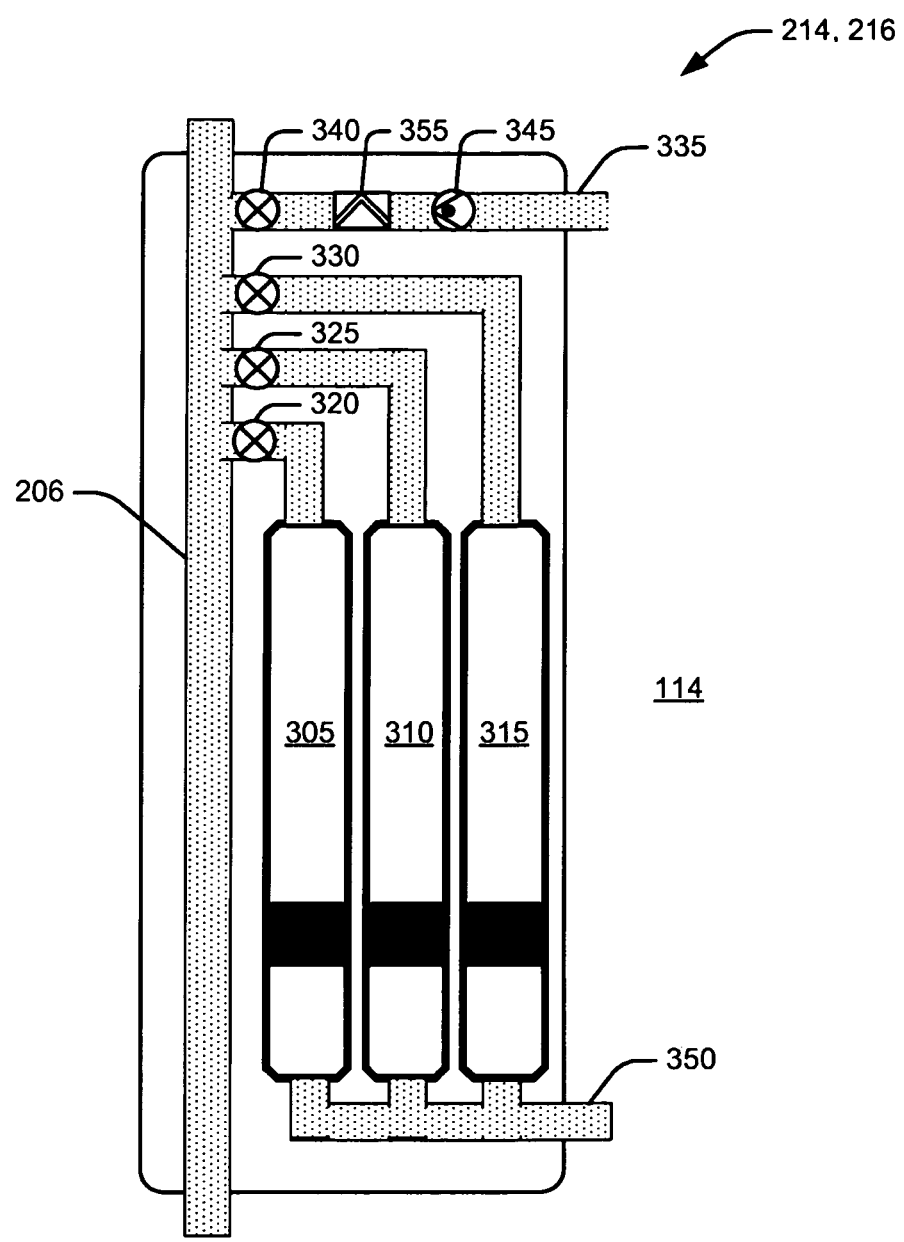
FIG. 3 is a schematic representation of one embodiment of a multi-chamber section.

In one embodiment, the multi-chamber sections 214, 216 include multiple sample chamber 305, 310, 315, as shown in FIG. 3. While FIGS. 2 and 3 shown the multi-chamber sections 214, 216 having three sample chambers 305, 310, 315, it will be understood that the multi-chamber sections 214, 216 can have any number of sample chambers. It will also be understood that multi-chamber section 214 can have a different number of sample chambers than multi-chamber section 216.

In one embodiment, the sample chambers 305, 310, 315 are coupled to the channel 206 through respective chamber valves 320, 325, 330. In one embodiment, reservoir fluid can be directed from the channel 206 to a selected sample chamber by opening the appropriate chamber valve. For example, reservoir fluid can be directed from the channel 206 to sample chamber 305 by opening chamber valve 320, reservoir fluid can be directed from the channel 206 to sample chamber 310 by opening chamber valve 325, and reservoir fluid can be directed from the channel 206 to sample chamber 315 by opening chamber valve 330. In one embodiment, when one chamber valve is open the others are closed.

In one embodiment, the multi-chamber sections 214, 216 include a path 335 from the channel 206 to the annulus 114 through a valve 340. Valve 340 is open during the draw-down period when the formation tester is clearing mud cake, drilling mud, and other contaminants into the annulus before clean formation fluid is directed to one of the sample chambers 305, 310, 315. A check valve 345 prevents fluids from the annulus 114 from flowing back into the channel 206 through the path 335. In one embodiment, the multi-chamber sections 214, 216 include a path 350 from the sample chambers 305, 310, 315 to the annulus 114.

One embodiment of a sample chamber 305 (and in one embodiment 310 and 315) is illustrated in FIG. 4A, which shows the sample chamber before a sample is taken, and FIG. 4B, which shows the sample chamber after a sample is taken. In one embodiment, the sample chamber 305 has a channel end 402 and an annulus end 404. At the channel end 402, the sample chamber includes an inlet port 406 which communicates with the channel 206 through valve 320 (see FIG. 3). In one embodiment, the inlet port 406 proceeds through a connector 408 and a seal 409 to a vent 410 into a sample compartment 412. In one embodiment, the inlet port can be sealed by a valve 450, which provides a sufficient seal that the sample chamber 305 can be safely shipped when it is removed from the formation testing tool 125.

In one embodiment, as shown in FIG. 4A, the inlet port 406 is sealed by a sample piston 416, which is capable of traveling the entire length of the sample compartment 412. The sample piston 416 divides the sample compartment 412 into a sample side 413 on the side of the sample compartment 412 closest to the channel end 402 (shown most clearly in FIG. 4B), and an $N_2$/mud side 414 on the side of the sample compartment 412 closest to the annulus end 404 (shown most clearly in FIG. 4A). The sizes of the sample side 413 and the $N_2$/mud side 414 vary with movement of the sample piston 416. In the embodiment shown in FIG. 4A, the $N_2$/mud side 414 of the sample compartment 412 is pressurized, for example with nitrogen gas, which causes the sample piston 416 to move toward the channel end 402 and seal the inlet port 406. In one embodiment, the pressurization of the $N_2$/mud side 414 of the sample compartment 412 takes place at the surface before the sample chamber 305 is inserted into the formation testing tool 125.

In the embodiment shown in FIG. 4A, the inlet port 406 is also partially sealed by a concentrating object 418. In one embodiment, the concentrating object fits into indentations in the seal 409 and sample piston 416 and partially obstructs the vent 410 when the sample piston 416 is pressed against the seal 409.

In one embodiment, the end of the sample compartment 412 closest to the annulus end 404 of the sample chamber 305 is sealed by an annulus piston 419, which moves back and forth within the sample compartment 412. An annulus path 420 communicates annulus fluids through an annulus seal 422 to the annulus piston 419, which moves to compress the fluid in the sample compartment 412 until its pressure substantially matches the annulus pressure.

In one embodiment, the annulus piston 419 is not present and the sample piston 416 performs the same function of compressing the fluid in the sample compartment 412 until its pressure matches the annulus pressure.

In the embodiment shown in FIG. 4B, a sample of formation fluid has been pumped into the sample side 413 of the sample compartment 412. To illustrate one way this might have been accomplished and referring to FIGS. 2, 3, 4A and 4B, one or both of the probes 218, 220 were extended until they were pressed against the borehole wall. One or both of the stabilizers 228, 230 were extended to hold the formation testing tool 125 in place laterally. The valve 340 opening path 335 was opened and the high-volume pump 212 was engaged until a determination was made that uncontaminated formation fluid was being drawn through the probes 218, 220. The valve 340 was then closed and the valves 320 and 414 were opened. This allowed formation fluid to flow through the inlet port 406 and through the vent 410 to engage the sample piston 416. The pressure developed by the high-volume pump was sufficient to overcome the annulus pressure. As a result, the sample piston 416 moved back into the sample compartment 412 and the sample side 413 of the sample compartment 412 filled with formation fluid. The sample side 413 of the sample compartment 412 continued to fill until it reached the state shown in FIG. 4B with the sample piston 416 against the annulus piston 419. Valve 320 was then closed, sealing the inlet port 406 and the sample compartment 412.

In one embodiment, as can be seen in FIG. 4B, when sample side 413 of the sample compartment 412 is partially or completely filled with formation fluid the concentration object 418 moves freely within the sample compartment 412. In one embodiment, the concentration object 418 is tethered by a flexible or rigid member within the sample compartment 412.

In one embodiment, the drill string 110 is withdrawn from the borehole 112 and the sample chambers e.g., 305, 310, 315 are removed from the formation testing tool 125. In one embodiment, the sample chambers are designed in such a way that they can be removed from the formation testing tool with minimal loss of sampled fluids. Further, in one embodiment, the sample chambers are designed and built to be transported air, ground, or sea over long distances to laboratories where the fluids they contain can be analyzed to determine their hydrocarbon contents and other measurements of interest. In one embodiment, the designs of the sample chambers are certified by, for example, the United States Department of Transportation ("USDOT") for transporting fluids at specified pressures.

Oil wells are being drilled to greater depths than ever before. As one result, the pressures at which the actuators and sensors 120, and in particular the formation testing tool 125, operate have increased over the years. Where in previous years, the maximum pressure that such tools might experience might be 20,000 pounds per square inch ("psi"), operations are being pushed into areas in which the pressures might be 30,000 psi or even higher.

Existing sample chambers certified by the USDOT for transportation when carrying fluids at pressures up to 20,000 psi may not be certified for sampling and transporting at pressures up to 30,000 psi.

Figures 5, 6, 7:
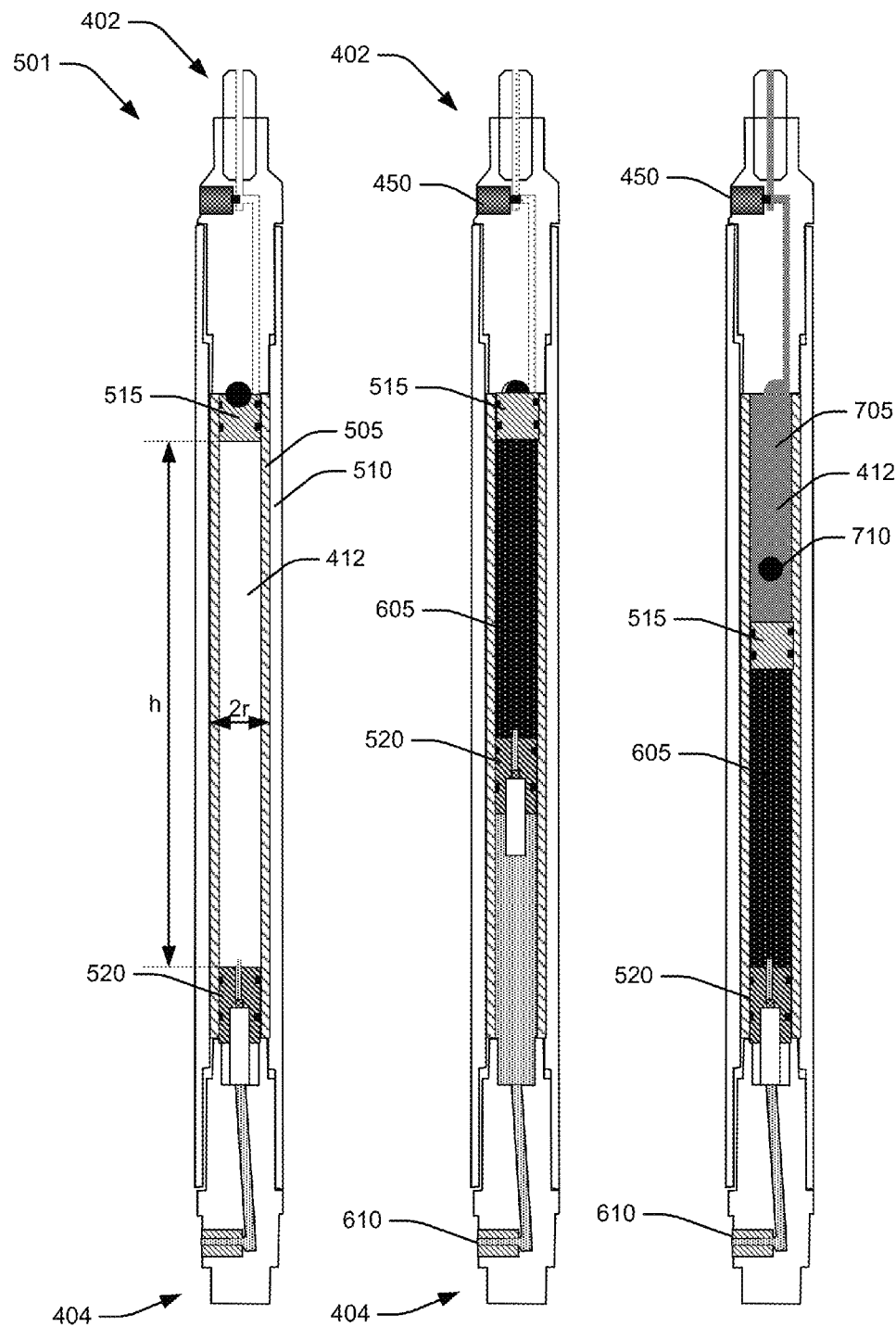

In one embodiment of a modified sample chamber 501, illustrated in FIG. 5, a sleeve 505 is incorporated into the sample compartment 412. In one embodiment, the sleeve 505 is constructed of a high-strength material that is resistant to corrosion, easily machined, and inexpensive. In one embodiment, the sleeve is constructed from one of the Inconel 718 family of alloys. In one embodiment, the sleeve is constructed from a high strength Beta Ti alloy such as NP-35.

In one embodiment, the sleeve 505 reduces the surface area of the sample compartment 412 that is exposed to the high pressure of the reservoir fluids so that the bulkhead 510 of the sample compartment experiences no more pressure than it was rated to accept under the USDOT certification that the design without the sleeve 505 received. The design of such a modified sample chambers may be certifiable by the USDOT for transporting fluids at higher pressures without the extensive testing usually required for such certification.

In one embodiment, the inner surface area of the sample chamber is reduced by adjusting the diameter (i.e., 2r) and/or the height (h) of the sample compartment 412.

In one embodiment, the sleeve 505 is securely sealed to the sample compartment bulkhead 510 so that no fluids leak between the sleeve and the bulkhead even at very high pressures. In one embodiment, the secure seal is accomplished using a deep continuous fusion weld. In one embodiment, the seal between the sleeve and the bulkhead is accomplished using fine threads with seals, such as o-rings, backup o-rings, and lubricant.

In one embodiment, the modified sample chamber 501 is constructed as illustrated in FIG. 5, with no fluids in the sample compartment 412. In one embodiment, the modified sample chamber 501 is prepared for use by partially filling the sample compartment 412 with hydraulic fluid 605, as shown in FIG. 6. In one embodiment, the hydraulic fluid 605 is a hydraulically hard fluid; i.e., it has low compressibility. In one embodiment, the hydraulic fluid includes cesium fomate.

When the drill string 110 is inserted in the borehole 112, as shown in FIG. 1, the formation testing tool is surrounded by fluids in the annulus 114. These fluids are at pressures commensurate with the depth of the borehole and the fluids in the formation being penetrated. In one embodiment, port 610 (see FIG. 6) communicates with the annulus through, for example, path 350 illustrated in FIG. 3. In one embodiment, the annulus fluids fill the sample compartment 412 behind the annulus piston 520, causing it, the hydraulic fluid 605, and the sample piston 515 to move to the positions shown in FIG. 6. In one embodiment, the valve 450 is closed at this point so that there is no pressure urging the sample piston away from the channel end 402 of the sample chamber 501.

In FIG. 7, a sample is being taken. In one embodiment, the valve 450 is open and sampled fluids 705 are pumped into the sample compartment 412 as described above. In one embodiment, the pressure in the sampled fluids overcomes the pressure being supplied by the annulus fluids through port 610, which causes the annulus piston 520, the hydraulic fluid 605 and the sample piston 515 to be driven to the positions shown in FIG. 7. In one embodiment, a concentration object 710 is suspended in the sample compartment and operates as described in PCT/US2008/74979, entitled "Acquiring and Concentrating a Selected Portion of a Sampled Reservoir Fluid," which is assigned to the same assignee as the present application.

One embodiment of a modified sample chamber 801, illustrated in FIG. 8, employs a sleeve 805 and a pressure-multiplying piston 810. In one embodiment, the sleeve 805 has the same design considerations as described above with respect to FIGS. 5-7 and performs the same function, i.e., that of reducing the pressure exerted on the sample chamber bulkhead 820 by high pressure fluids kept in the sample chamber 412 to pressures that it has been certified to contain. In one embodiment, the sleeve 805 does not extend the entire length of the sample compartment 412. Instead, in one embodiment, it extends a distance L from the surface of the sample chamber bulkhead 820 where pressure-multiplying piston 810 rests when it is as far toward the channel end of the modified sample chamber 801 as it can be driven. In one embodiment, L is significantly less than h, the length of the sample compartment (see FIG. 5). In one embodiment, "L is significantly less than h" means that L<0.75h. In one embodiment, "L is significantly less than h" means that L<0.5h. In one embodiment, "L is significantly less than h" means that L<0.25h.

In one embodiment, the pressure-multiplying piston 810 has two diameters. In one embodiment, a narrow diameter member 810A has substantially the same diameter as the sleeve 805 so that it fits sealingly within the sleeve 805. Seals 825, indicated by the black squares (only one is indicated), improve the seal between the narrow diameter member 810A and the sleeve 805. In one embodiment, the seals 825 are o-rings with back-up o-rings and lubricant. In one embodiment, a wide diameter member 810B has substantially the same diameter as the sample bulkhead 815 so that it fits sealingly within the inner walls of the sample chamber bulkhead 815. In one embodiment, seals 830, indicated by the black squares (only one is indicated), improve the seal between the wide diameter member 810B and the bulkhead 815. In one embodiment, the seals 830 are o-rings with back-up o-rings and lubricant. In one embodiment, the narrow diameter member 810A and the wide diameter member 810 are formed from a single piece of metal. In one embodiment, the narrow diameter member 810A and the wide diameter member 810 are bolted or welded together.

In one embodiment, a hydraulic fluid 835, similar to that described above with respect to FIGS. 5-7, is injected into the sample compartment 412 between the pressure-multiplying piston 810 and an annulus piston 840 as the sample chamber 801 is being prepared to be deployed. In one embodiment of another deployment-preparation step, an inert gas, such as nitrogen ($N_2$) is injected into port 905 and into the sample compartment 412. In one embodiment, the inert gas drives the annulus piston 840, the hydraulic fluid 835, and the pressure-multiplying piston 810 to the positions shown in FIG. 9. After the sample chamber 801 is set in the condition shown in FIG. 9, port 905 is sealed. In one embodiment, the seal is a plug 915 that is inserted into the port 905. In one embodiment, the seal is a valve.

When it is time to take a sample, in one embodiment shown in FIG. 10, the valve 450 is opened and fluids are pumped through the port at the channel end 402 of the sample chamber 801.

In one embodiment, sample fluid 1005 enters the sample chamber 412 and, if its pressure is sufficient to overcome the pressure of the inert gas, it drives the pressure-multiplying piston 810, the hydraulic fluid 835, and the annulus piston 840 away from the channel end 402 of the sample chamber 801 until equilibrium is achieved.

In one embodiment, that equilibrium is defined by a number of factors. First, in one embodiment the pressure P2 exerted by the sample fluid 1005 through the pressure-multiplying piston 810 on the hydraulic fluid 835 is reduced from the pressure P1 of the sample fluid 1005 by the ratio of the area $A_N$ of the narrow diameter member 810A to the area $A_W$ of the wide diameter member 810B according to the following equation:

$$P2 = P1 \frac{A_N}{A_W} \text{ or} \qquad (1)$$

$$P2 = P1 * \frac{R_N^2}{R_W^2} \qquad (2)$$

where:
$R_N$ is the radius of the narrow diameter member 810A, and
$R_W$ is the radius of the wide diameter member 810B.

In one embodiment, the actual pressure P2 is slightly lower than that defined by the equation because of the action of the seals 825, 830 on the pressure-multiplying piston 810 and the seals on the annulus piston 840. Further, in one embodiment, the pressure-multiplying piston 810 and the annulus piston advance away from the channel end 402 of the sample chamber in a "stick-and-slip" manner as a sample is being taken. In one embodiment, each piston will stick until the pressure to advance exceeds the friction in the respective seals that tend to keep them in place. Then the previously-stuck piston advances until the pressure to advance is reduced to the point where the seal friction stops its movement.

In one embodiment, standard design tools used to determine the thickness of the sleeve 505 using information regarding the design of the original sample compartment and the pressure that the modified sample compartment is required to hold.

Figure 11:
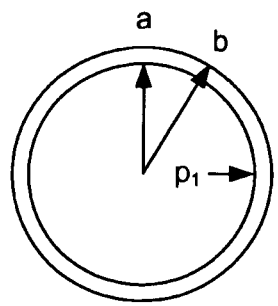
FIG. 11 shows a cross section of a sample chamber without a sleeve.

In one embodiment, the thickness of the sleeve 505 is calculated as follows. First, assume that the sample compartment has an inner radius "a," an outer radius "b," and containing a fluid at a maximum pressure $P_1$ as shown in FIG. 11.

According to John F. Harvey, *Pressure Component Construction* (Van Nostrand Reinhold 1974) at 57, the general expressions for normal stresses in a cylinder under internal pressure only are:

$$\sigma_r = \frac{a^2 p_i}{b^2 - a^2}\left(1 - \frac{b^2}{r^2}\right) \quad (2.8.18)$$

$$\sigma_t = \frac{a^2 p_i}{b^2 - a^2}\left(1 + \frac{b^2}{r^2}\right) \quad (2.8.19)$$

These equations show that both stresses [$\sigma_r$ (radial stress) and $\sigma_t$ (hoop stress)] are maximum at the inner surface where r has the minimum value; $\sigma_r$ is always a compressive stress, and smaller than $\sigma_t$; and $\sigma_t$ [is] a tensile stress which is maximum at the inner surface of the cylinder equal to $$\sigma_{tmax} = \frac{p_i(a^2 + b^2)}{b^2 - a^2} \quad (2.8.20)$$

Figure 12:
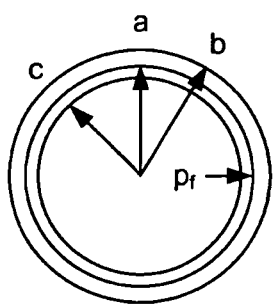
FIG. 12 shows a cross section of a sample chamber with a sleeve.

Now, assume that the inner sleeve is added, resulting in the configuration shown in FIG. 12, where the inner radius of the sleeve is "c" and the new pressure is $p_f$.

The idea is to keep the value of the hoop stress at the surface where the sleeve meets the bulkhead, i.e. $\sigma_t$ evaluated at r=a, less than the value of $\sigma_{tmax}$ in Harvey's equation 2.8.20. This can be evaluated by setting Harvey's equation 2.8.20 equal to Harvey's equation 2.8.19 evaluated at r=a and at pressure $p_f$:

$$\frac{p_i(a^2 + b^2)}{b^2 - a^2} = \frac{c^2 p_f}{b^2 - c^2}\left(1 + \frac{b^2}{a^2}\right) \quad (3)$$

$$\frac{p_i(a^2 + b^2)}{b^2 - a^2} = \frac{c^2 p_f}{b^2 - c^2}\left(\frac{a^2 + b^2}{a^2}\right) \quad (4)$$

$$\frac{p_i}{b^2 - a^2} = \frac{c^2 p_f}{b^2 - c^2}\left(\frac{1}{a^2}\right) \quad (5)$$

$$a^2 p_i = \frac{c^2 p_f}{b^2 - c^2}(b^2 - a^2) \quad (6)$$

$$a^2 p_i = \frac{b^2 c^2 p_f}{b^2 - c^2} - \frac{a^2 c^2 p_f}{b^2 - c^2} \quad (7)$$

$$a^2 p_i + \frac{a^2 c^2 p_f}{b^2 - c^2} = \frac{b^2 c^2 p_f}{b^2 - c^2} \quad (8)$$

$$a^2 p_i(b^2 - c^2) + a^2 c^2 p_f = b^2 c^2 p_f \quad (9)$$

$$c^2(p_f b^2 - p_f a^2 + p_i a^2) = p_i a^2 b^2 \quad (10)$$

$$c^2 = \frac{p_i a^2 b^2}{(p_f b^2 - p_f a^2 + p_i a^2)} \quad (11)$$

$$c = \sqrt{\frac{p_i a^2 b^2}{(p_f b^2 - p_f a^2 + p_i a^2)}} \quad (12)$$

For example, assume b=1 inch, a=0.6875 inches ($^{10}\!/_{16}$ inch wall), $p_i$=20,000 lbs., and $p_f$=30,000 lbs. Solving equation (10) with these values, c=0.611583, which makes the sleeve 0.075917 inches thick.

In one embodiment, the pressure-multiplying piston 810 is sized so that the pressure in the chamber containing the hydraulic fluid 835 remains within specifications, which provides another data point for the thickness of the sleeve. Solving equation (2) for $R_N$:

$$R_N = R_W \sqrt{\frac{P2}{P1}} \quad (13)$$

In the example above, $R_W=b=1$, $P2=p_i=20,000$, and $P1=p_f=30,000$. Solving equation (13) with these values, $R_N=0.561341$ inches, which makes the sleeve 0.126159 inches thick.

In one embodiment, the larger of the two possible sleeve thicknesses will be chosen. In the example, the thickness of the sleeve would be at least 0.126159 inches.

Figure 13:
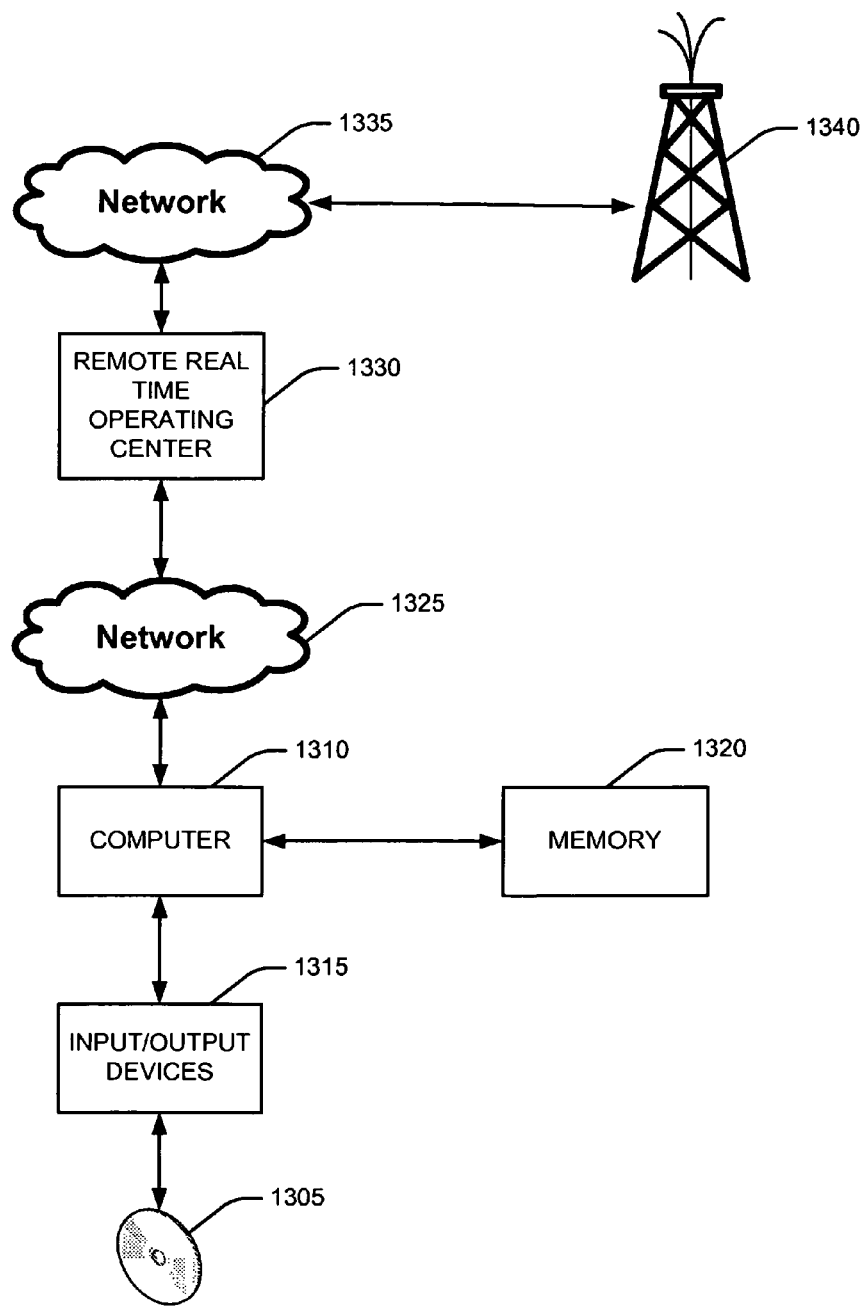
FIG. 13 illustrates an environment including a remote real time operating center.

In one embodiment, the status and control function for controlling the formation testing tool 125 is stored in the form of a computer program on a computer readable media 1305, such as a CD or DVD, as shown in FIG. 13. In one embodiment a computer 1310, which may be the same as computer 140 or which may be below the surface in the drill string, reads the computer program from the computer readable media 1305 through an input/output device 1315 and stores it in a memory 1320 where it is prepared for execution through compiling and linking, if necessary, and then executed. In one embodiment, the system accepts inputs through an input/output device 1315, such as a keyboard, and provides outputs through an input/output device 1315, such as a monitor or printer. In one embodiment, the system stores the results of concentration calculations in memory 1320 or modifies such calculations that already exist in memory 1320.

In one embodiment, the results of concentration calculations that reside in memory 1320 are made available through a network 1325 to a remote real time operating center 1330. In one embodiment, the remote real time operating center makes the results of concentration calculations, available through a network 1335 to help in the planning of oil wells 1340 or in the drilling of oil wells 1340. Similarly, in one embodiment, the formation testing tool 125 can be controlled from the remote real time operating center 1330.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method comprising:
    acquiring a pressure vessel, the pressure vessel including:
        a cylindrical sample compartment having an inner volume,
        a sample piston slidingly located within the sample compartment;
        an annulus piston slidingly located within the sample compartment;
    reducing the inner volume of the cylindrical sample volume by securely sealing a sleeve within the cylindrical sample compartment, the sleeve having an inner diameter;
    replacing the sample piston with a replacement sample piston having a diameter substantially the same as the inner diameter of the sleeve; and
    replacing the annulus piston with a replacement annulus piston having a diameter substantially the same as the inner diameter of the sleeve.

2. The method of claim 1 wherein securely sealing the sleeve comprises using a securing technique selected from the group consisting of (a) a deep continuous fusion welding the sleeve to the cylindrical sample compartment and (b) creating a threaded connection, including seals, backup seals and lubricant, between the sleeve and the cylindrical sample compartment.

* * * * *